United States Patent
Bacchetta et al.

(10) Patent No.: US 6,579,007 B1
(45) Date of Patent: Jun. 17, 2003

(54) INTRAORAL DENTAL RADIOGRAPHIC FILM PACKET WITH THERMOPLASTIC COMFORT ENHANCING INTEGRATED FRAME

(75) Inventors: Richard W. Bacchetta, Rochester, NY (US); Scott H. Schwallie, Rochester, NY (US); Fugui He, Penfield, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

(21) Appl. No.: 09/534,368

(22) Filed: Mar. 24, 2000

(51) Int. Cl.$^7$ .................................. A61B 6/14

(52) U.S. Cl. ....................... 378/169; 378/171

(58) Field of Search ................. 378/168, 184, 378/38, 171, 169

(56) References Cited

U.S. PATENT DOCUMENTS

| | | | | |
|---|---|---|---|---|
| 1,537,925 A | * | 5/1925 | Bolin | ................. 378/169 |
| 1,631,497 A | | 6/1927 | Marler | |
| 2,084,092 A | | 6/1937 | Kenney | |
| 4,626,216 A | | 12/1986 | Strong-Grainger | |
| 4,791,657 A | | 12/1988 | Kirsch et al. | |
| 4,805,201 A | | 2/1989 | Strong-Grainger | |
| 4,847,884 A | | 7/1989 | Dove | |

(List continued on next page.)

FOREIGN PATENT DOCUMENTS

| | | |
|---|---|---|
| EP | 0564011 | 10/1993 |
| FR | 2627076 | 8/1989 |

OTHER PUBLICATIONS

U.S. patent application Ser. No. 09/533,867, Bacchetta et al., filed Mar. 24, 2000.
U.S. patent application Ser. No. 09/534,372, Bacchetta et al., filed Mar. 24, 2000.
U.S. patent application Ser. No. 09/534,393, Bacchetta et al., filed Mar. 24, 2000.
U.S. patent application Ser. No. 09/534,370, Bacchetta et al., filed Mar. 24, 2000.
U.S. patent application Ser. No. 09/533,868, Resch et al., filed Mar. 24, 2000.
U.S. patent application Ser. No. 09/534,392, Earnhart et al., filed Mar. 24, 2000.
U.S. patent application Ser. No. 09/534,516, Resch et al., filed Mar. 24, 2000.

Primary Examiner—Robert H. Kim
Assistant Examiner—Hoon K. Song

(57) ABSTRACT

An intraoral x-ray film packet is taught which includes a molded thermoplastic frame (preferably injection molded) to which an x-ray dental packet is sealed. The sealing method can be any one of a number of processes including, but not limited to RF sealing, induction heat sealing, or ultrasonic sealing, as well as using any one of various adhesives to affix the x-ray dental packet to the frame. The injection molded thermoplastic frame provides a cushion to buffer and a soft rounded edge to mask the sharp edges that occur on plastic encased x-ray dental packets. Sealing of the injection molded thermoplastic frame to the x-ray dental packet during manufacture results in a packet which includes a comfort enhancing perimeter frame permanently integrated therewith. In such manner, the dental film packet is manufactured with an integrally formed perimetric cushion. The dental film packet is preferably formed with an outer envelope wherein one of the opposing outer sheets is more rigid than the other. In this way, the laminated perimetric edge formed to bond the two outer sheets together is generally coplanar with the more rigid of the two outer sheets. This resultant planar surface on one side of the packet aids in the accurate positioning of the packet into the frame and further enhances the ability to die cut the packet and maintain outside dimension tolerances.

20 Claims, 2 Drawing Sheets

U.S. PATENT DOCUMENTS

| | | |
|---|---|---|
| 4,852,143 A | 7/1989 | Scheier et al. |
| 4,911,871 A | 3/1990 | Liese, Jr. |
| 4,912,740 A * | 3/1990 | Liese, Jr. .................... 378/169 |
| 4,913,288 A | 4/1990 | Tanaka |
| 4,922,511 A | 5/1990 | Gay |
| 5,044,008 A * | 8/1991 | Jackson ..................... 378/169 |
| 5,077,779 A | 12/1991 | Steinhausen, Jr. |
| 5,170,423 A | 12/1992 | Yurosko |
| 5,285,491 A | 2/1994 | Muylle et al. |
| 5,784,433 A | 7/1998 | Higa |

* cited by examiner

INTRAORAL DENTAL RADIOGRAPHIC FILM PACKET WITH THERMOPLASTIC COMFORT ENHANCING INTEGRATED FRAME

FIELD OF THE INVENTION

The present invention relates generally to x-ray film packets and, in particularly, to intraoral radiographic film packets with comfort enhancing features.

BACKGROUND OF THE INVENTION

A common problem experienced by people visiting the dentist is the discomfort and pain associated with the taking of dental x-rays caused by the positioning of intraoral radiographic film packets in the patient's mouth. The typical intraoral radiographic film packet includes relatively hard and/or relatively sharp edges that press against and irritate the gums and other oral soft tissue of the person whose teeth are being x-rayed. A variety of intraoral x-ray dental packets are known in the prior art which include features intended to be comfort enhancing. In addition, attempts have been made to create comfort enhancing structures into which intraoral-x-ray dental packets can be inserted prior to placement in the patient's mouth. One example of this type of structure is taught in U.S. Pat. No. 5,044,008 titled "Dental Film Cartridge Cushion," by Reginald B. Jackson, Aug. 27, 1991. Jackson utilizes a cartridge cushion comprising a foam sheet sandwich into which the x-ray dental packet is placed for the purpose of cushioning and increasing the comfort to the patient. Jackson requires the manual insertion of the x-ray packet into the cartridge cushion. Thus, Jackson adds significant bulk to the packet and enhances the possibility of triggering a gag reflex action in the patient. Additionally, after the cartridge cushion is removed from the packet, it would be possible to reuse the cartridge cushion which would not be sanitary.

A second example of an add-on structure is taught in U.S. Pat. No. 5,285,491 titled "Dental Film Packet," by Wilfried Muylle et al., Feb. 8, 1994. Muylle et al. teaches sealing a film pack in an envelope consisting of a pair of thin pockets of injection molded plastic which are sealed with a band of adhesive tape. The envelope has no sharp edges and generally rounded corners. Thus, as with Jackson's device, this device requires manual insertion of the packet, adds significant bulk to the packet, enhances the possibility of triggering a gag reflex in the patient, and can also be reused in a non-sanitary manner.

U.S. Pat. No. 1,631,497 titled "Dental X-ray Film Package," by Harry L. Marler, Jun. 7, 1927. Marler teaches a dental x-ray film package wherein a sensitized sheet is sandwiched between two opaque sheets. A heavy band of rubber is stretched about the periphery of the package to hold the package securely together and to provide the light tight joint.

U.S. Pat. No. 1,537,925 titled "Dental X-ray Film Package," by Leonard M. Bolin, May 12, 1925, teaches a dental x-ray film package wherein a pair of film sheets and the cover sheet are inserted into a container. The container consists of a frame including a backing portion in an enlarged continuous beading about the periphery thereof. The beading must be forced away from the backing portion and stretched peripherally in order to insert the film sheets and cover sheet therein. The container thus serves to hold the package together and provide the light seal.

U.S. Pat. No. 4,791,657 titled "Intraoral Radiographic Film Packet," by Alan Kirsch et al., Dec. 13, 1988, teaches a dental radiographic film packet which includes soft corners for greater patient comfort. The packet is constructed by removing all material from the corners of a typical dental radiographic film packet with the exception of the film chip. Individual corner covers which are seamless pockets are then added to the four corners of the packet. The corner covers create an airspace at each corner around the edge of the film chip.

U.S. Pat. No. 2,084,092 titled "Dental Film Holder," by Ralph Kenney, Jun. 15, 1937, teaches a dental film holder that is a stretchable vellum rubber plate with integral corner pockets into which an x-ray dental packet may be manually inserted. Kenney's dental film holder is intended to be reusable.

From the foregoing it can be seen that many attempts to add a comfort enhancing feature to dental x-ray film packets have resulted in structures requiring manual assembly and/or modification of individual film packets in order to receive comfort enhancing structure. Further, such prior art attempts, particularly those seeking to provide the comfort enhancing feature via a frame, have resulted in a significant increase in bulk thereby enhancing the possibility of inducing a gag reflex, and/or also resulted in a structure in which additional manual steps are required for assembly and/or disassembly.

SUMMARY OF THE INVENTION

It is therefore the object of the present invention to provide an intraoral radiographic film packet with a comfort enhancing perimeter.

It is a further object of the present invention to provide an intraoral radiographic film packet which has a comfort enhancing perimeter frame permanently integrated therewith during manufacture.

Yet another object of the present invention is to provide an intraoral radiographic film packet including a comfort enhancing perimeter which does not significantly increase the bulk of the film packet.

Still another object of the present invention is to provide a comfort enhancing perimeter feature for an intraoral radiographic film packet that cannot be reused in a non-sanitary manner.

The foregoing and numerous other features, objects and advantages of the present invention will become readily apparent upon a review of the detailed description, claims and drawings set forth herein. These features, objects and advantages are accomplished by forming a molded thermoplastic frame (preferably injection molded) to which an x-ray dental packet is sealed. The sealing method can be any one of a number of processes including, but not limited to RF sealing, induction heat sealing, or ultrasonic sealing, as well as using any one of various adhesives to affix the x-ray dental packet to the frame.

The purpose of the molded thermoplastic frame is to provide a cushion to buffer and, a soft rounded edge to mask the sharp edges that occur on plastic encased x-ray dental packets. The design of the present invention is such that all edges of the typical prior art x-ray packet are buffered. These sharp edges as well as the interior elements of these packets cause considerable patient discomfort during the x-ray process. Sealing of the injection molded thermoplastic frame to the x-ray dental packet during manufacture results in a packet that includes a comfort enhancing perimeter frame permanently integrated therewith. In such manner, the dental film packet is manufactured with an integrally formed perimetric cushion. The dental film packet is preferably formed with an outer envelope wherein one of the opposing outer sheets is more rigid than the other. In this way, the laminated perimetric edge formed to bond the two outer sheets together is generally coplanar with the more rigid of the two outer sheets. This resultant planar surface on one side of the packet aids in the accurate positioning of the packet into the frame and further enhances the ability to die cut the packet and maintain outside dimension tolerances.

DETAILED DESCRIPTION OF THE INVENTION

Figure 1:
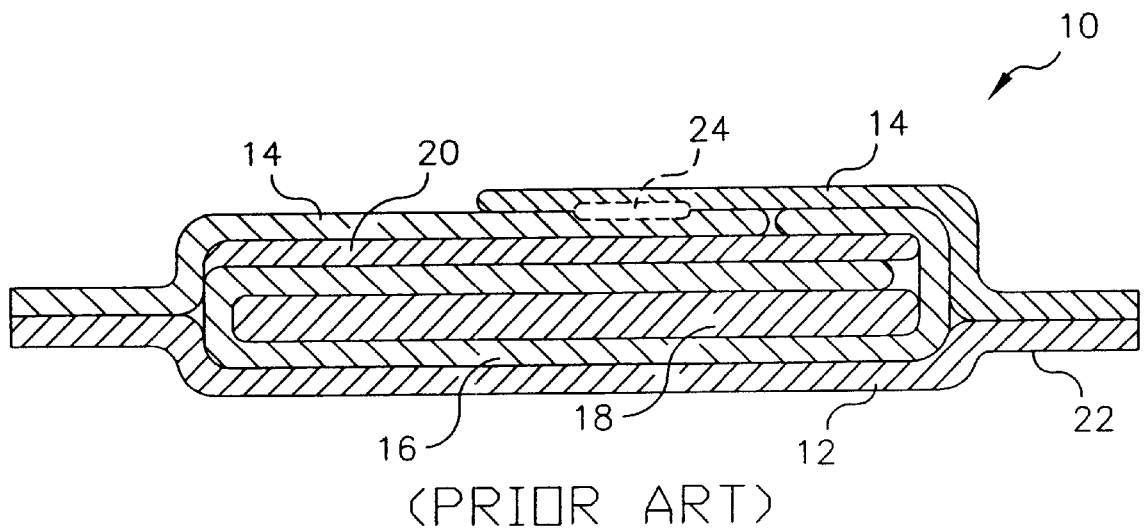
FIG. 1 is a cross-sectional view of a typical prior art dental film packet.

Turning first to FIG. 1, there is shown a cross-section of a typical prior art dental film packet 10. Dental film packet 10 includes an outer envelope comprising a vinyl sheet 12 on one face of the dental film packet 10 and a pair of overlapping vinyl sheets 14 on the opposite face thereof. Contained between the sheet 12 and overlapping sheets 14 are a paper wrap element 16, a film chip 18 and a lead foil 20. Vinyl sheets 12 and 14 project beyond dimensions of the paper wrap element 16, the film chip 18 and lead foil 20 to yield a laminated perimetric edge 22. Laminated perimetric edge 22 allows for heat sealing of vinyl sheets 12 and 14 to one another to yield a light tight perimeter to the dental film packet 10. In addition, a heat seal 24 is generated at the overlap of vinyl sheets 14 to provide an outer envelope which is completely light tight and which is substantially watertight. This prior art dental film packet 10 therefore includes a relatively stiff and sharp perimetric edge created by the laminated perimetric edge 22. It is this relatively stiff and sharp perimetric edge which causes discomfort to the patient.

Figure 2:
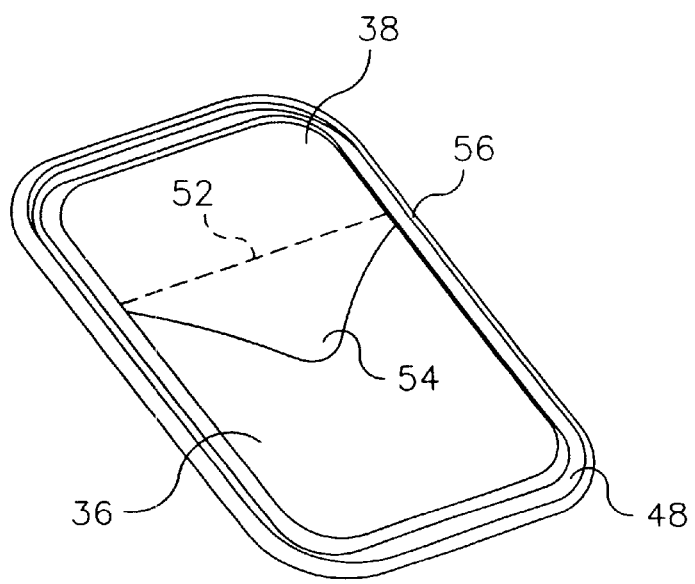
FIG. 2 is a perspective view of the intraoral radiographic film packet with comfort enhancing perimeter frame of the present invention affixed thereto.
Figure 3:
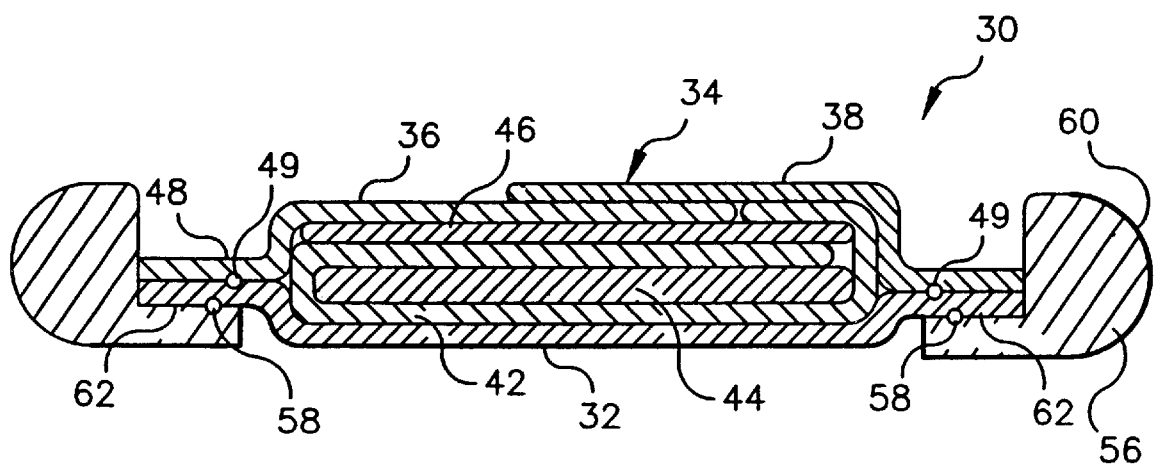
FIG. 3 is a cross-sectional view of the intraoral radiographic film packet with comfort enhancing perimeter frame of the present invention taken along line 3—3 of FIG. 2.
Figure 4:
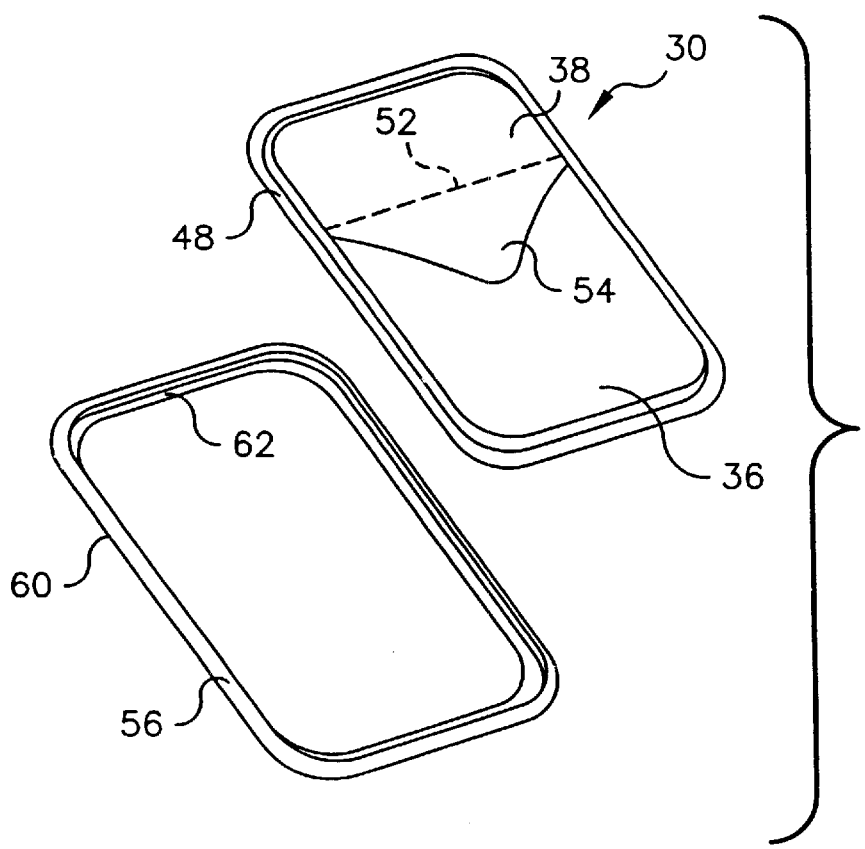
FIG. 4 is a partially exploded perspective view of the intraoral radiographic film packet of FIG. 2 shown without the comfort enhancing perimeter frame affixed thereto.

Turning next to FIGS. 2, 3 and 4, there is shown the dental film packet 30 of the present invention. Dental film packet 30 includes an envelope comprising a first outer sheet 32 and an opposing second outer sheet 34. Second outer sheet 34 is actually comprised of a pair of overlapping sections 36 and 38. Outer sheets 32 and 34 are preferably made of a soft thermoplastic material such as, but not limited to polyvinyl chloride (PVC), or ethylene vinyl acetate (EVA). Sandwiched between outer sheets 32 and 34 are the typical elements found in a dental x-ray film packet. There is a paper wrap element 42, the film chip 44 and a lead foil 46. The dental x-ray film packet 30 is assembled by placing the paper wrap element 42, the film chip 44 and a lead foil 46 between outer sheets 32 and 34 and sealing the outer sheets 32 and 34 to one another to form a perimetric laminated edge 48. Perimetric laminated edge 48 can be formed by heat sealing, RF sealing, ultrasonic sealing, or any other sealing mechanism (indicated by dot 49) which can create a substantially airtight bond between outer sheets 32 and 34. A seal is indicated in FIG. 3 by dot 49. There is also a transverse seal (indicated by line 52) affixing overlapping sections 36 and 38 together. Overlapping section 38 is preferably formed with a tab portion 54 which extends past transverse seal 52 to facilitate removal of the envelope for extraction and development of the film chip 44 after exposure.

The dental x-ray film packet 30 is attached to a thermoplastic injection molded frame 56. A soft thermoplastic material, such as but not limited to, Polyvinyl chloride (PVC) is used for the frame 56. The thermoplastic material preferably has a relatively low durometer material (e.g. 50 to 90 Shore A) to enhance the soft feeling. Frame 56 includes a rounded perimetric edge 60 and a recessed shelf 62. The attachment is made preferably by means of RF sealing, induction sealing, ultrasonic sealing, or the use of adhesive. A seal (indicated by dot 58) is generated by bonding perimetric laminated edge 48 to recessed shelf 62. The purpose of the frame 56 with rounded perimetric edge 60 is to provide a cushioning barrier to the hard interior components of the packet 30. The cut edges of the perimetric laminated edge 48 are interior to the rounded perimetric edge 60 of the frame 56, and therefore, contact of these cut edges with the soft tissues of a patient's mouth is eliminated.

In the preferred embodiment of the present invention outer sheet 32 is formed of a more rigid material than that of outer sheet 34. In this manner, the laminated perimetric edge 48 becomes substantially coplanar with outer sheet 32 as opposed to the perimetric edge of the prior art dental packet 10 shown in FIG. 1 which is positioned more toward the center of the dental packet 10. This flatter (more planar) surface aids in the accurate positioning of the packet 30 into the frame 56. Further, the more rigid material enhances the ability to die cut the packet 30 and maintain outside dimensions within tolerances which enhances the ability to fit the packet 30 within the frame 56 and which is needed for automated assembly. As long as the material is more rigid, both outer sheets 32 and 34 forming the outer envelope of the packet 30 can be made of this more rigid material to garner the same benefits of positioning and dimensional control stated above.

One way of making outer sheet 32 more rigid is by reducing the amount of plasticizer used in the thermoplastic material of outer sheet 32. For example, in the case of polyvinyl chloride (PVC), the plasticizer could be dioctyl adipate (DOA) or dioctyl phthalte (DOP). The effect of reducing the amount of plasticizer is to increase the stiffness or modulus of the material from which outer sheet 32 is made so that during the heat sealing operation to form the perimetric laminated edge 48, the application of heat and the effects of the heating fixture do not as readily deform the material toward the center of the thickness of the packet 30 as was typical with the prior art packet 10.

Those skilled in the art will recognize that there are two versions of dental x-ray film packets. One is composed of layers of soft thermoplastic sheets between which film, cardboard and a lead barrier are sealed. A second version uses stiff paper for the outer envelope. The stiff paper version includes the same internal elements as the thermoplastic sheet version. Both of these versions can take advantage of this invention. Of course, with the stiff paper version of the dental packet, attachment to the frame would preferably be by adhesive bonding.

Although the molded frame 56 is described herein as preferably being formed by an injection molding process, it should be recognized that other molding processes can also be used. For example, frame 56 can be molded using casting process, a pressure forming process, or a thermoforming process.

Those skilled in the art will also recognize that there are now digital radiography products available which are intended to be used in place of dental x-ray film packets. One example of this type of technology uses a plate that is coated with phosphorous. When exposed to radiation, the plate will create an image that can be scanned with a laser into a computer instead of being chemically processed. To the extent that these products have the same problems of patient discomfort, the present invention can be used to solve such problems. Similarly, intraoral products which use a CCD sensor array may also achieve some level of comfort benefit through the application of the present invention.

From the foregoing, it will be seen that this invention is one well adapted to obtain all of the ends and objects hereinabove set forth together with other advantages which are apparent and which are inherent to the apparatus.

It will be understood that certain features and subcombinations are of utility and may be employed with reference to other features and subcombinations. This is contemplated by and is within the scope of the claims.

As many possible embodiments may be made of the invention without departing from the scope thereof, it is to be understood that all matter herein set forth and shown in the accompanying drawings is to be interpreted as illustrative and not in an illuminating sense.

PARTS LIST 10 dental film packet (prior art)
12 outer envelope comprising a vinyl sheet
14 outer envelope comprising overlapping vinyl sheets
16 paper wrap element
18 film chip
20 lead foil
22 laminated perimetric edge
24 heat seal
30 dental film packet (present invention)
32 outer envelope comprising a first outer sheet
34 outer envelope—opposing second outer sheet
36 overlapping sections
38 overlapping sections
42 paper wrap element
44 film chip
46 lead foil
48 laminated perimetric edge
49 seal
52 transverse seal
54 tab portion
56 injection molded frame
58 seal
60 rounded perimetric edge
62 recessed shelf

What is claimed is:

1. An intraoral x-ray film packet comprising:
   (a) an outer envelope including a laminated perimetric edge;
   (b) a film chip contained within said outer envelope; and
   (c) a separately molded thermoplastic frame including a recessed shelf, said recessed shelf allowing said outer envelope with said film chip to be directly inserted therein without deformation of the thermoplastic frame and said film chip, said laminated perimetric edge being affixed to said molded thermoplastic frame.

2. An intraoral x-ray film packet comprising:
   (a) a first outer sheet;
   (b) a second outer sheet;
   (c) a film chip residing between said first outer sheet and said second outer sheet;
   (d) a continuous perimetric seal affixing said first outer sheet and said second outer sheet and forming a film packet with a perimetric laminated edge; and
   (e) a separately molded thermoplastic frame including a recessed shelf, said recessed shelf allowing said film packet to be directly inserted therein without deformation of the thermoplastic frame and said film packet, said laminated perimetric edge being affixed to said recessed shelf.

3. An intraoral x-ray film packet as recited in claim 2 wherein:
   said second outer sheet comprises a pair of overlapping sections.

4. An intraoral x-ray film packet as recited in claim 3 wherein:
   said second outer sheet further comprises a transverse seal affixing said pair of overlapping sections.

5. An intraoral x-ray film packet as recited in claim 4 wherein:
   one of said pair of overlapping sections includes a tab portion to facilitate removal of said first and second outer sheets.

6. An intraoral x-ray film packet as recited in claim 2 wherein:
   said first and second outer sheets are made from a thermoplastic material.

7. An intraoral x-ray film packet as recited in claim 2 wherein:
   said perimetric seal is formed by RF sealing.

8. An intraoral x-ray film packet as recited in claim 2 wherein:
   said perimetric seal is formed by heat sealing.

9. An intraoral x-ray film packet as recited in claim 4 wherein:
   said transverse seal is formed by RF sealing.

10. An intraoral x-ray film packet as recited in claim 4 wherein:
    said transverse seal is formed by heat sealing.

11. An intraoral x-ray film packet as recited in claim 2 wherein:
    said first outer sheet is more rigid then said second outer sheet thereby yielding a perimetric laminated edge which is substantially coplanar with said first outer sheet.

12. An intraoral x-ray film packet as recited in claim 2 wherein:
    said perimetric laminated edge is substantially coplanar with said first outer sheet.

13. An intraoral x-ray film packet as recited in claim 1 wherein:
    said laminated perimetric edge is affixed to said recessed shelf.

14. An intraoral x-ray film packet as recited in claim 2 wherein:
    said perimetric seal is formed by ultrasonic sealing.

15. An intraoral x-ray film packet as recited in claim 2 wherein:
    said perimetric seal is formed by induction sealing.

16. An intraoral x-ray film packet as recited in claim 4 wherein:
    said transverse seal is formed by ultrasonic sealing.

17. An intraoral x-ray film packet as recited in claim 4 wherein:
    said transverse seal is formed by induction sealing.

18. An intraoral x-ray film packet as recited in claim 2 wherein:
    said perimetric seal is formed by adhesive bonding.

19. An intraoral x-ray film packet as recited in claim 4 wherein:
    said transverse seal is formed by adhesive bonding.

20. An intraoral x-ray film packet as recited in claim 2 wherein:
    said molded thermoplastic frame is injection molded.

* * * * *